(12) United States Patent
Chang et al.

(10) Patent No.: US 7,239,052 B2
(45) Date of Patent: Jul. 3, 2007

(54) MAGNETIC ACTUATORS

(75) Inventors: Chii-How Chang, Taoyuan Hsien (TW); Sean Chang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 95 days.

(21) Appl. No.: 11/194,548

(22) Filed: Aug. 2, 2005

(65) Prior Publication Data
US 2006/0028071 A1 Feb. 9, 2006

(30) Foreign Application Priority Data
Aug. 4, 2004 (TW) .............................. 93123327 A

(51) Int. Cl.
*H20K 41/00* (2006.01)
(52) U.S. Cl. ............................ 310/15; 310/17; 310/20; 310/21; 310/22; 310/27; 310/29; 310/32; 310/33
(58) Field of Classification Search .................. 310/15, 310/17, 20, 21, 22, 27, 29, 32, 33, 36–38
See application file for complete search history.

(56) References Cited

U.S. PATENT DOCUMENTS

| | | | | |
|---|---|---|---|---|
| 5,587,852 A | * | 12/1996 | Yoshiura et al. | 360/78.12 |
| 5,914,836 A | * | 6/1999 | Pottebaum | 360/264.8 |
| 6,064,121 A | * | 5/2000 | Shervington et al. | 290/1 A |
| 6,225,712 B1 | * | 5/2001 | Miyamoto et al. | 310/15 |
| 6,421,208 B1 | * | 7/2002 | Oveyssi | 360/264.8 |
| 6,661,129 B2 | * | 12/2003 | Tamura et al. | 310/12 |
| 6,787,941 B2 | * | 9/2004 | Takashima | 310/12 |

* cited by examiner

*Primary Examiner*—Darren Schuberg
*Assistant Examiner*—Iraj A. Mohandesi
(74) *Attorney, Agent, or Firm*—Birch, Stewart, Kolasch & Birch, LLP

(57) ABSTRACT

A magnetic actuator. A yoke includes a first opening and a second opening, a frame, and a path. A first magnet is disposed in the first opening in the vicinity of the frame. A second magnet is disposed in the second opening in the vicinity of the frame. A coil comprises a wire surrounding the path. A light shield is connected to an end of the coil. A guiding element disposed outside the path is connected to an end of the coil. When current passes through the coil, the coil moves along the path by magnetic induction between the first magnet and the second magnet such that the iris diaphragm is adjustable by the light shield. When there is no current through the coil, dynamic force produced by the guiding element returns the light shield to its original position.

21 Claims, 12 Drawing Sheets

MAGNETIC ACTUATORS

BACKGROUND

The invention relates to a magnetic actuator, and in particular to a magnetic actuator used with an iris diaphragm.

Optical devices such as optical projectors, rear projectors, or cameras comprise a light control device such as an iris diaphragm controller, adjusting light intensity to produce images of different light intensity. Conventional iris diaphragms are controlled by a dynamic or magnetic mechanism. When the conventional iris diaphragm controller is not in use, however, the light shield automatically returns to its default position, normally by spring force.

A conventional iris diaphragm controller comprising elastic restoring force is shown in FIGS. 1A to 1E, comprising a yoke 10, a first magnet 11, a second magnet 12, a coil 15, a light shield 16, a shaft 17, and a spring 18. The yoke 10 is a rectangular piece with a hole 107 defined therein. Conventionally, the yoke 10 comprises two U-shaped pieces with ends thereof facing each other. The first magnet 11 and second magnet 12 are disposed in the hole 107 of the yoke 10, respectively on opposing sides thereof. The first magnet 11 and second magnet 12 are arranged with opposite polarities facing each other, as shown in FIG. 1C. The North pole of the first magnet 11 is located at the left side of the coil 15, and the South pole thereof is located at the right side. The polarity of the second magnet 12 is opposite that of the first magnet 11 such that an upward magnetic field is generated on the right side of the coil 15, and a downward magnetic field is generated on the left side. The coil 15 comprises electric wires, located between the first magnet 11 and the second magnet 12. The shaft 17 extending from a side of the coil 15 comprises an opening 170. The light shield 16 is connected to the coil 15 on an opposite end of the shaft 17. The light shield 16 is normally disposed along the light path, perpendicular to thereto to block light. The shaft 17 has a spring 18 disposed thereon. The spring 18 has two ends thereof fixed on the shaft 17 and the yoke 10, respectively.

As shown in FIGS. 1C to 1E, when current passes through the coil 15 in the direction shown by the solid arrows in FIG. 1D, since current flows from right to left on the upper side of the coil 15, the magnetic field is perpendicular thereto and oriented from the FIG. 1D. According to the right hand rule, the coil 15 produces upward force. Since the shaft 17 is connected to a side of the coil 15, and another shaft (not shown) pivots on the opening 170, the coil 15 moves with respect to the opening 170 as a center point along the cross section line A-A'. That is, the coil 15 moves counterclockwise as shown by the hollow arrow of FIG. 1D. The lower side of the coil 15 is used as an example. When current flows from left to right, the magnetic field is perpendicular thereto and oriented into the FIG. 1D. According to the right-hand-rule, the coil 15 produces upward force. The coil 15 moves around the opening 170 as a center point along the cross section line A-A', in a counterclockwise direction shown by the hollow arrow of FIG. 1D. As a result, the coil 15 moves the light shield 16 with respect to the opening 170, as shown in FIG. 1E in a counterclockwise direction. If current volume is adjusted accurately, angle of the circular motion of the coil 15 can be controlled such that the light shield 16 controls the size of the iris diaphragm.

If there is no current through the coil 15, magnetic field between the coil 15 and the first and second magnets 11, 12 is not induced. After the spring 18 is extended, an elastic restoring force is generated. Consequently, the coil 15 is moved with respect to the opening 170 along the cross section line A-A' in a clockwise direction, as shown by the hollow arrow in FIG. 1E. Thus, the spring 18 returns the coil 15, the shaft 17, and the light shield 16 to their original position.

However, the structure of the coil is complicated and difficult to fabricate, elevating manufacturing costs. Furthermore, since the magnetic fields generated by the magnetic structure thereof are not uniform, the relationship between the current volume in the coil and the circular motion is difficult to control. To achieve sufficient actuating force for the magnetic actuator, volume is increased. The width thereof cannot be reduced. Moreover, restoring force produced by the spring increases with extension of the spring, making it difficult to control. Lifetime of the spring is short, with elasticity thereof depleting over time.

SUMMARY

A magnetic actuator is provided, for adjusting an iris diaphragm, applicable in an optical device, comprising a yoke, a first magnet, a second magnet, a coil, and a guiding element. The yoke comprises a first opening and a second opening, a frame encircling the first opening and the second opening, and a path between the first opening and the second opening. The cross section of the path can be circular, rectangular or polygonal. The first magnet is disposed in the first opening in the vicinity of the frame. The second magnet is disposed in the second opening in the vicinity of the frame. The coil comprises a wire surrounding the path. A shaft extending from a side of the light shield opposing to the coil comprises a hole. The light shield is connected to an end of the coil. The guiding element disposed outside the path is connected to an end of the coil. When current passes through the coil, the coil moves back and forth along the path by magnetic induction between the first magnet and the second magnet such that the iris diaphragm is adjustable by the light shield. When there is no current through the coil, dynamic force produced by the guiding element returns the light shield to its original position.

Accordingly, the guiding element may be a third magnet, producing dynamic force by attraction and repulsion forces generated between the third magnet and the path to return the light shield to the original position, or by the third magnet and a fourth magnet, to return the light shield to the original position. The fourth magnet is disposed on the yoke.

The guiding element may be a metal block, producing dynamic force by attraction forces between a fourth magnet and the metal block to return the light shield to the original position. The fourth magnet is disposed on the yoke.

Additionally, the yoke comprises two L-shaped yoke plates and a U-shaped yoke plate. The L-shaped yoke plates are disposed symmetrically, constituting the path and one side of the frame, and the U-shaped yoke plate constitutes the other three sides of the frame.

The yoke may alternatively comprise two U-shaped yoke plates and a flat yoke plate. Each U-shaped yoke plate comprises a side, the sides thereof symmetrically arranged, contacting each other and pointing in the same direction to form the path and the three sides of the frame. The flat yoke plate forms the fourth side of the frame.

The optical device can comprise an optical projector, a rear projector, or a camera.

DESCRIPTION OF THE DRAWINGS

The invention can be more fully understood by reading the subsequent detailed description in conjunction with the examples and references made to the accompanying drawings, wherein.

DETAILED DESCRIPTION

Figure 1A:
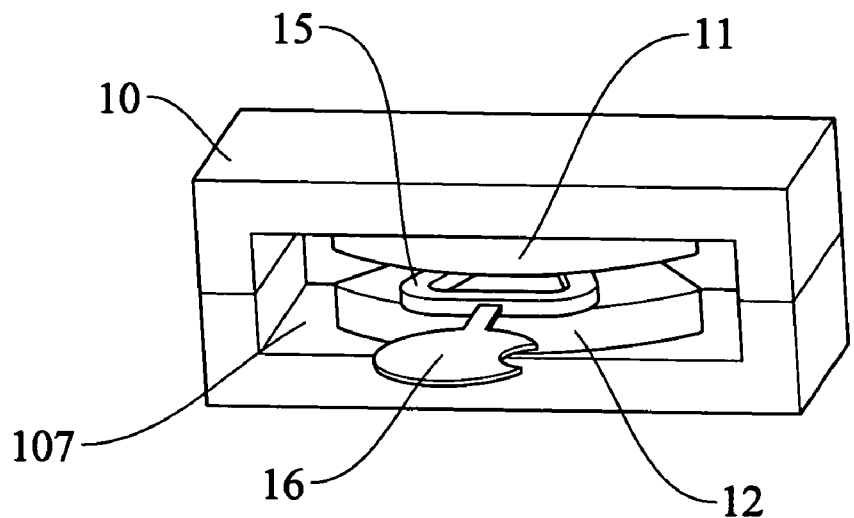
FIG. 1A is a schematic perspective view of a conventional iris diaphragm controller.
Figure 1B:
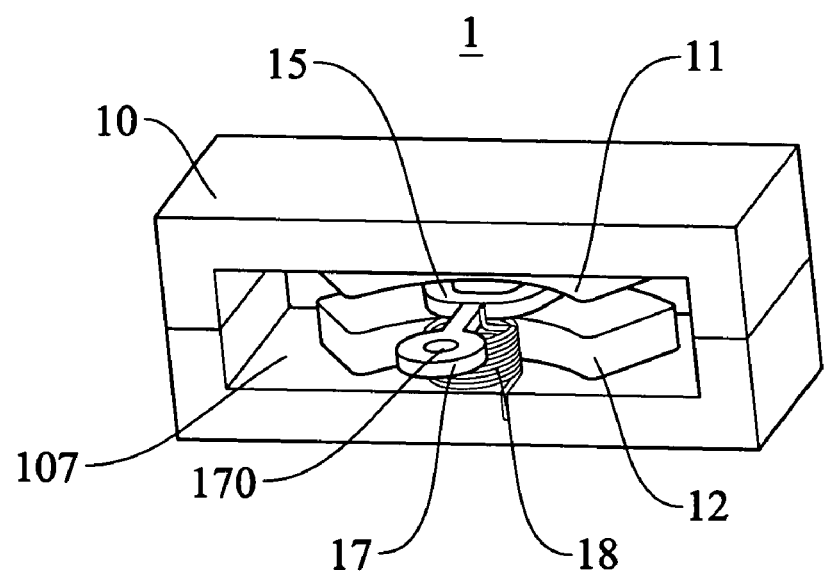
FIG. 1B is a schematic perspective view of the conventional iris diaphragm controller from another viewing angle.
Figure 1C:
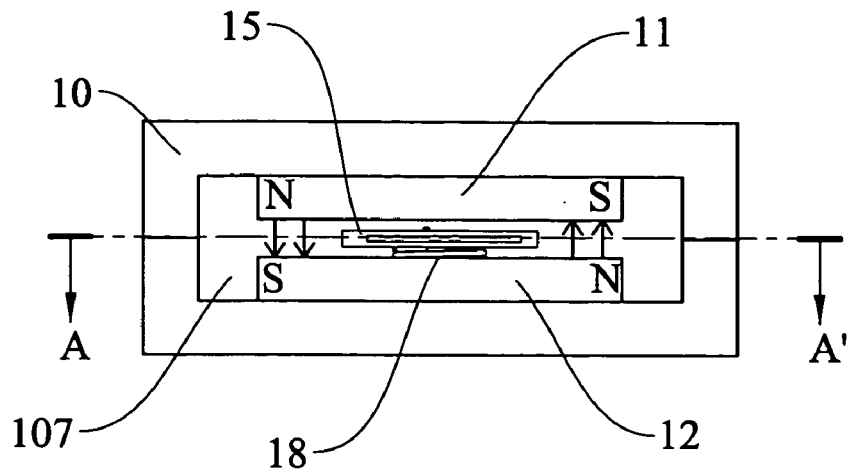
FIG. 1C is a front view of a conventional iris diaphragm controller.
Figure 1D:
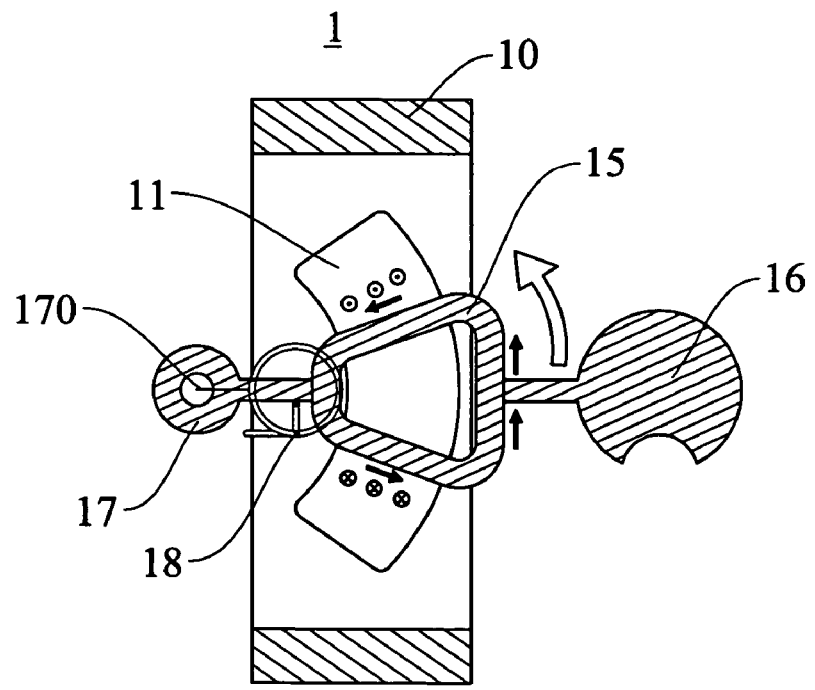
FIG. 1D is a cross section along a line A-A' of FIG. 1C.
Figure 1E:
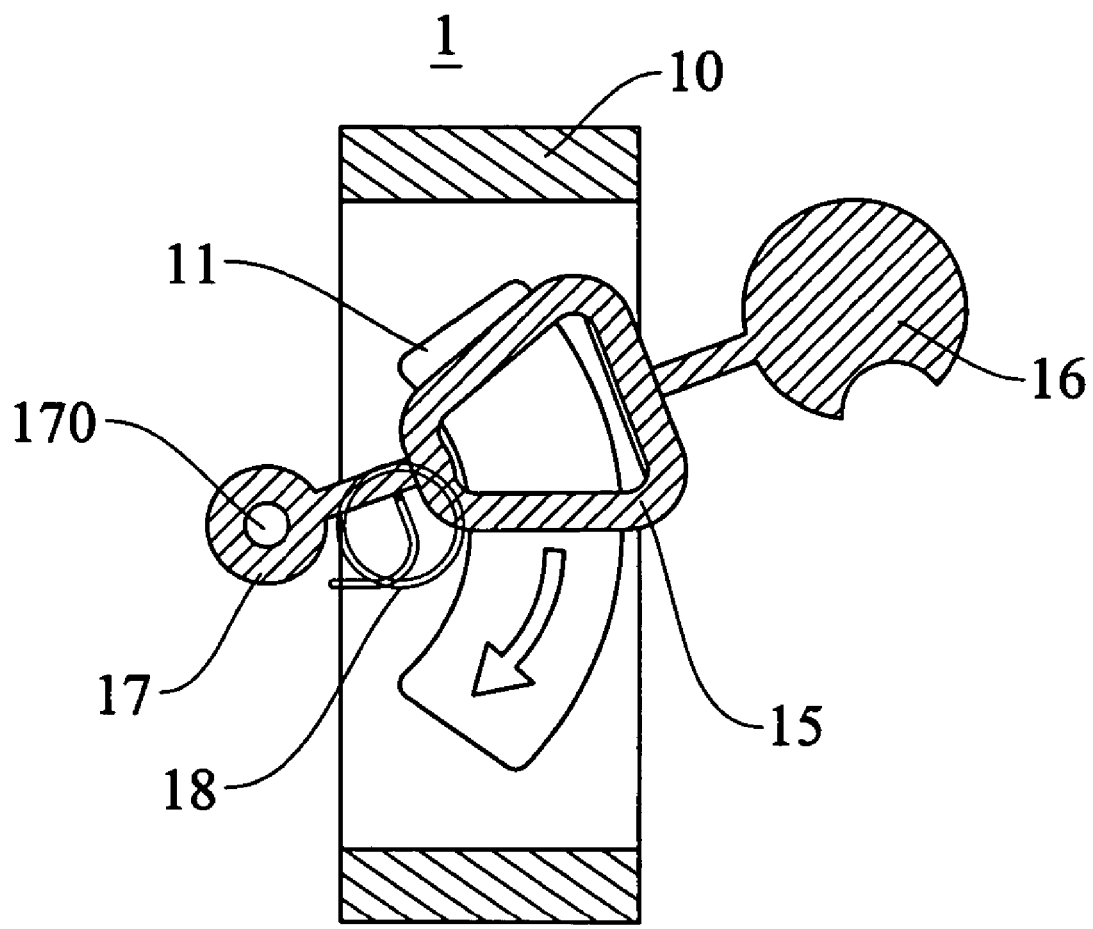
FIG. 1E is a cross section along a line A-A' of FIG. 1C with a light shield adjusting the size of iris diaphragm.
Figure 2A:
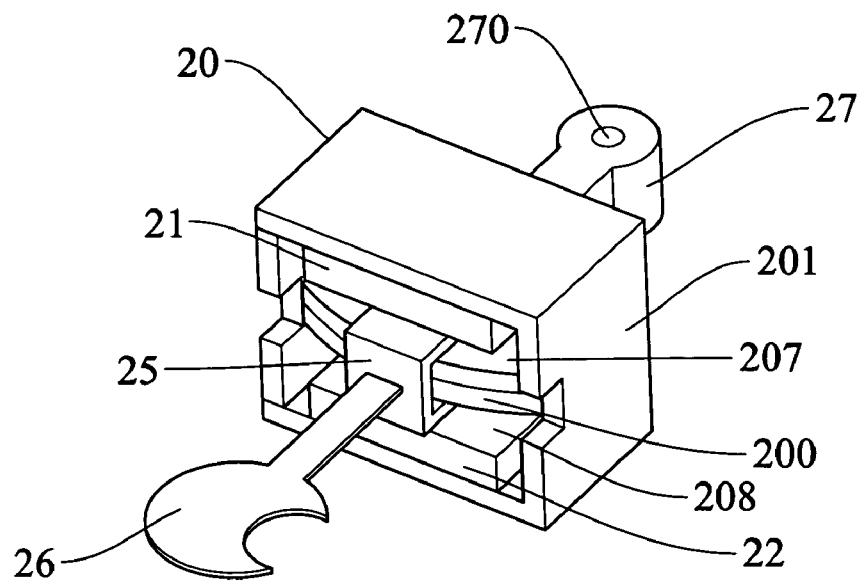
FIG. 2A is a perspective view of an embodiment of a magnetic actuator.
Figure 2B:
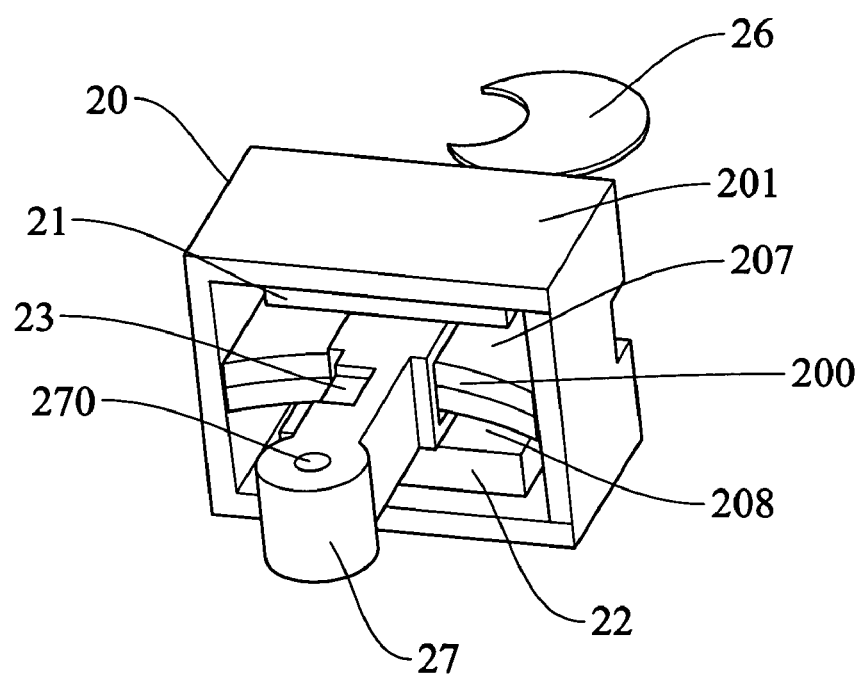
FIG. 2B is a perspective view of the magnetic actuator in FIG. 2A from a different angle.
Figure 2C:
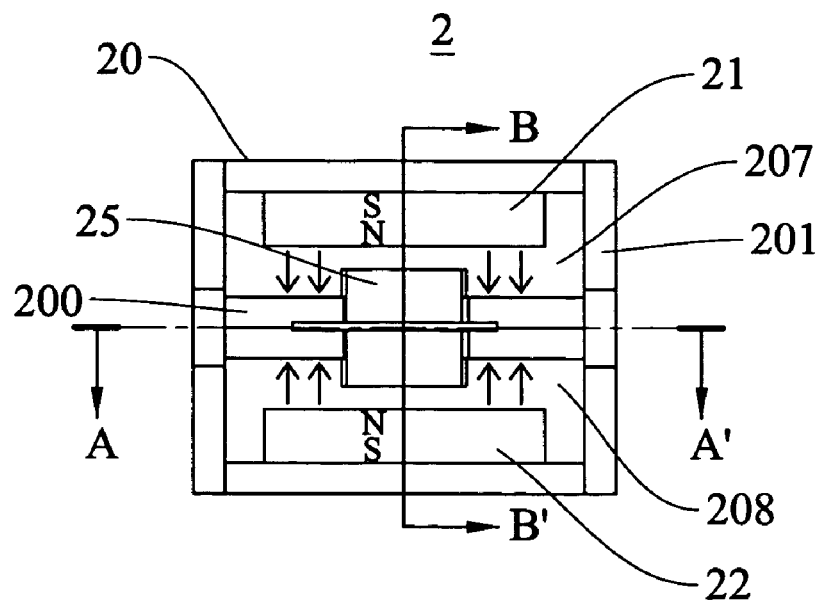
FIG. 2C is a front view of the magnetic actuator of FIG. 2A.

FIGS. 2A to 2F are schematic views of an embodiment of a magnetic actuator 2, comprising a yoke 20, a first magnet 21, a second magnet 22, a coil 25, a light shield 26, a shaft 27, and a third magnet 23. The yoke 20 comprises a first opening 207 and a second opening 208, a frame 201 encircling the first opening 207 and the second opening 208, and a path 200 therebetween, as shown in FIG. 2C. The yoke 20 forms a FIG. 8 from a front view. The first magnet 21 and the second magnet 22 are disposed in the first opening 207 and the second opening 208, respectively, in the vicinity of the frame 201. The first and second magnets 21 and 22 have facing polarity, such shown in FIG. 2C. The first magnet 21's South pole faces up and North pole faces down, opposite to the North pole of the second magnet 22, and South pole facing down. Magnetic field from top to bottom is generated in the first hole 207, and another magnetic field from bottom to top is generated in the second hole 208. If the size and shape of the first and second magnets 21 and 22 are substantially the same, the sizes of the magnetic fields are substantially equal. Note that the polarities of the first and the second magnets 21 and 22 can be opposite, providing the same result. The coil 25 comprises a wire (not shown) surrounding the path 200. The shaft 27 extending from a side of the coil 25 comprises a hole 270. The shaft 27 can be perpendicular to the path 200. Another shaft (not shown) pivots on the hole 270. The light shield 26 is connected to another end of the coil 25 opposite the hole 270. The light shield 26 is disposed on light path of the optical device with a moving direction perpendicular thereto to block progress of light. The shape of the light shield 26 is not limited, as long as it can block light. The third magnet 23 is disposed on the shaft 27, as shown in FIG. 2B. Note that the location of the third magnet 23 is not limited, and alternatively, the third magnet 23 can be disposed on the light shield 26.

Figure 2D:
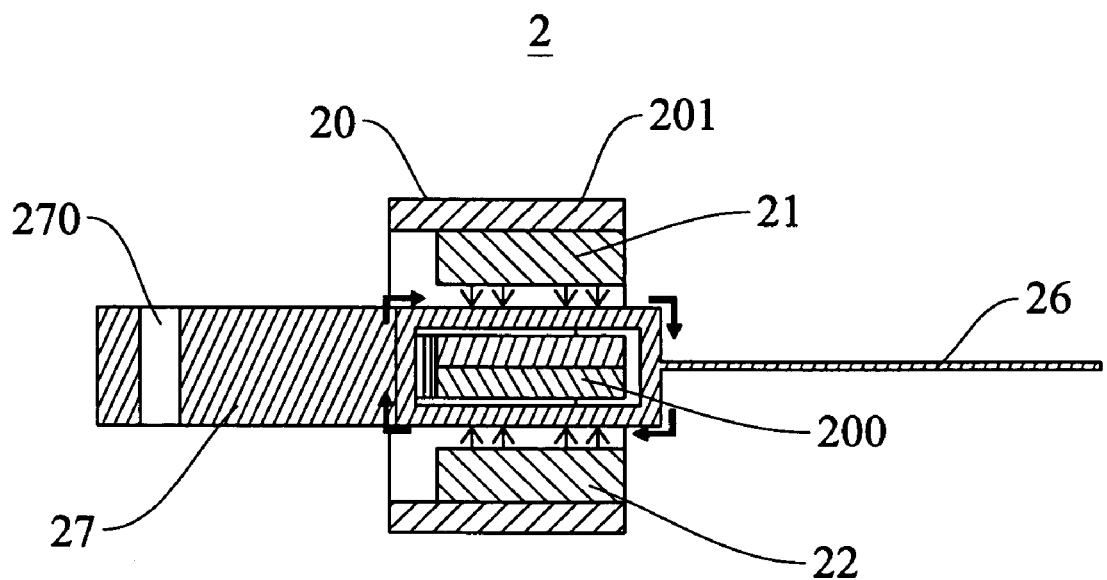
FIG. 2D is a cross section along a line B-B' of FIG. 2C.
Figure 2E:
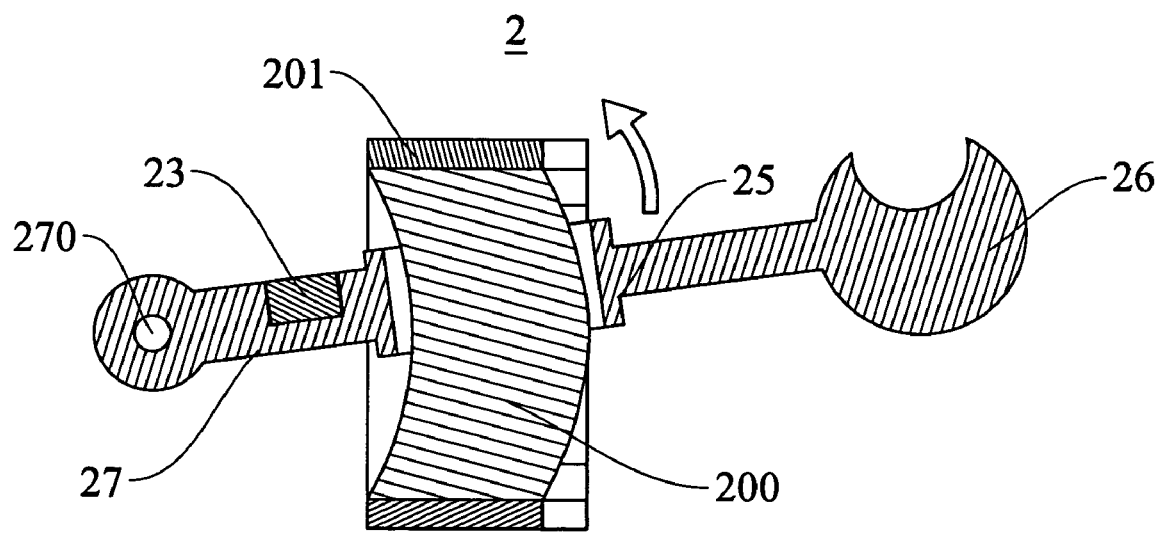
FIG. 2E is a cross section along a line A-A' of FIG. 2C with a light shield adjusting the size of iris diaphragm.

As shown in FIGS. 2C to 2F, current flows through the coil 25, in the direction is shown by the arrow of FIG. 2D. The current flow direction on the upper side of the coil 25 is from left to right, and magnetic field from top to bottom. According to the right-hand rule, a force produced by the coil 25 is perpendicular to the magnetic field and the current. The direction of the force is oriented into the FIG. 2D. Consequently, the coil 25 moves along cross section line A-A', and since the coil 25 is connected to the shaft 27 and another shaft (not shown) pivots on the hole 270, the coil 25 moves with respect to the hole 270 in a counterclockwise circular motion. The direction of the motion is shown by an hollow arrow in FIG. 2E. Thus, the coil 25 can move the light shield 26 around the hole 270 as a center point in a counterclockwise circular motion. If the current volume in the coil 25 is controlled, the angle of the circular motion of the coil 25 can be controlled such that the light shield 26 can adjust the size of the iris diaphragm.

Figure 2F:
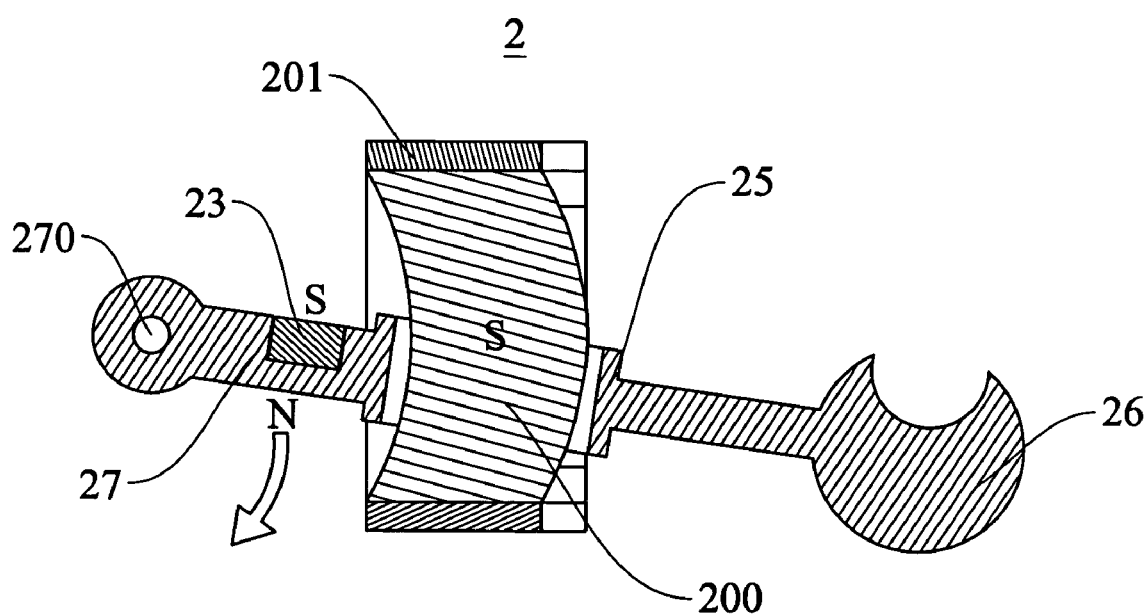
FIG. 2F is a cross section along a line A-A' of FIG. 2C with the light shield returning to its original position by a magnetic spring.

When there is no current through the coil 25, as shown in FIG. 2F, since the path 200 is magnetically induced by the first magnet 21 and the second magnet 22, the path 200 becomes a south pole. When the third magnet 23 is disposed on the shaft 27, the location of the North pole and the South pole is shown in FIG. 2F. The third magnet 23 is magnetically induced by the path 200 to produce a dynamic force. Since another shaft (not shown) pivots on the hole 270, the shaft 27 is moved with respect to the hole 270 as a center point along the cross section line A-A' in a clockwise circular motion. The direction of the clockwise circular motion is shown by an hollow arrow in FIG. 2F. The shaft 27 moves the coil 25 and the light shield 26 in the clockwise circular motion to return the light shield 26 to its original position.

The combination of the third magnet 23 and the path 200 provides a clockwise circular motion, and can be referred to as a magnetic spring structure. The third magnet 23 can be a guiding element.

Figure 2G:
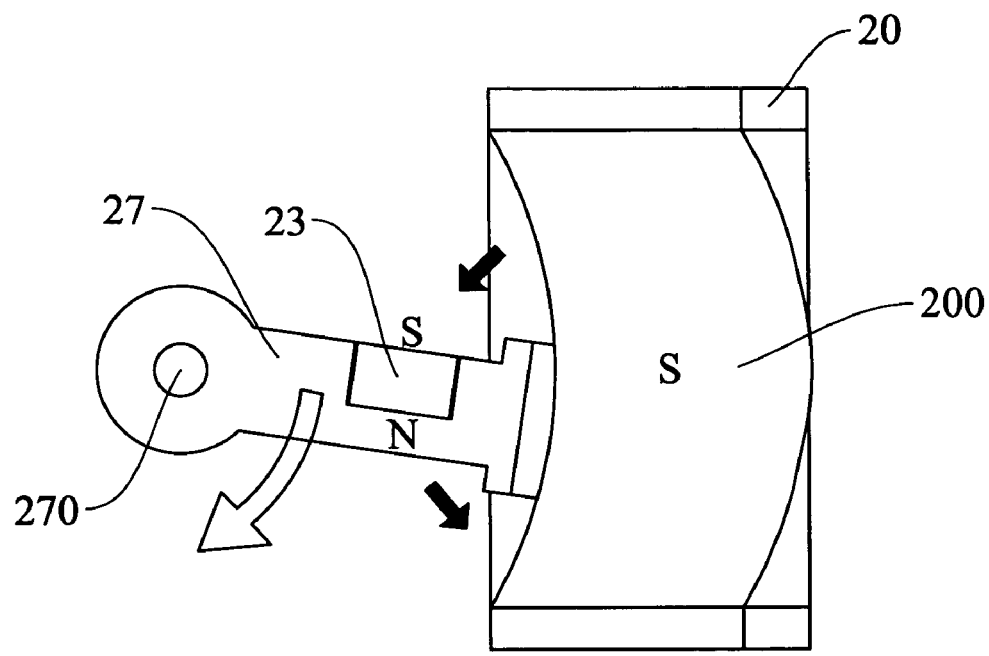
FIG. 2G is a cross section along a line A-A' of FIG. 2C, showing a detailed structure during motion of the magnetic spring.

FIG. 2G is a cross section along a line A-A' of FIG. 2C, showing a detailed structure during motion of the magnetic spring. A third magnet 23 is disposed on a side of the shaft 27 with the South pole thereof facing an exterior side of the shaft 27 and the North pole facing the shaft 27. Since the path 200 becomes a south pole, the South pole of the third magnet 23 receives a repulsion force from the path 200. Additionally, the North pole of the third magnet 23 receives an attraction force from the path 200. Since another shaft (not shown) pivots on the hole 270 as a center point, the third magnet 23 is magnetically induced by the path 200 to produce a magnetic dynamic force, thereby moving the shaft 27 in a clockwise circular motion, as shown by an hollow arrow of FIG. 2G.

Figure 2H:
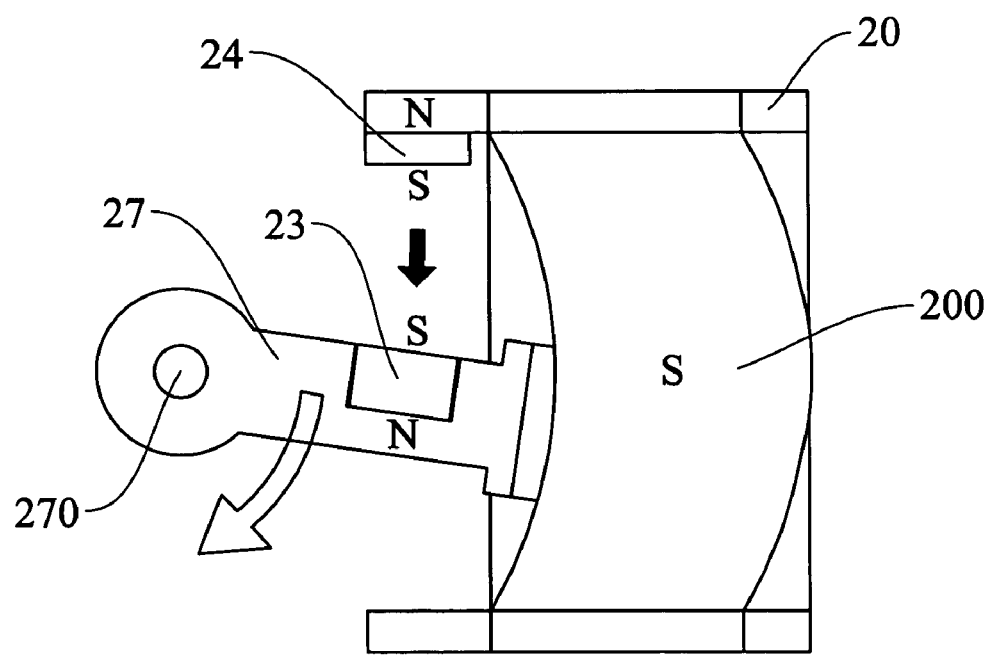
FIG. 2H is a cross section along a line A-A' of FIG. 2C, showing another detailed structure during motion of the magnetic spring.
Figure 2I:
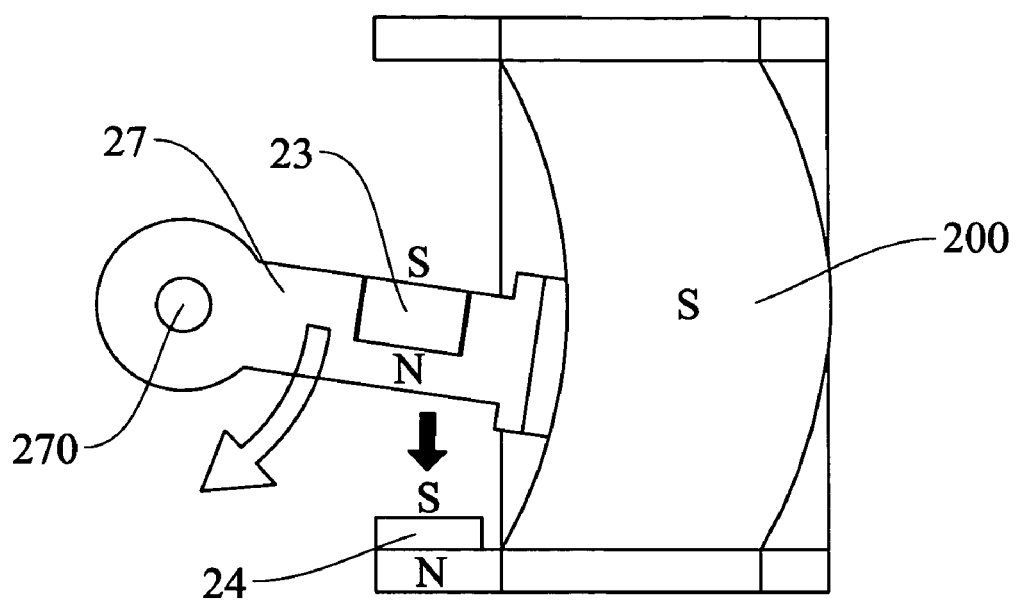
FIG. 2I is a cross section along a line A-A' of FIG. 2C, showing yet another detailed structure during motion of the magnetic spring.

Alternatively, as shown in FIG. 2H, a third magnet 23 can also be disposed on a side of the shaft 27 with the South pole facing an exterior side of the shaft 27 and the North pole facing the shaft 27. A fourth magnet 24 is disposed in an interior side of the yoke 20. The third and fourth magnets 23 and 24 have same poles facing each other. As shown in FIG. 2H, the fourth magnet 24 is located at the same level as the yoke 20 on an inner side thereof with the South pole facing down. Since the South pole of the third magnet 23 faces the South pole of the fourth magnet 24, a repulsion force is generated therebetween, providing dynamic force for the third magnet 23. Consequently, the shaft 27 moves in a clockwise circular motion, as shown by an hollow arrow in FIG. 2H. Moreover, as shown in FIG. 2I, if the fourth magnet 24 is disposed under the yoke 20 on an inner side thereof, and the South pole faces up, an attraction force is generated between the third and the fourth magnets 23 and 24, providing dynamic force to move the shaft 27 in a clockwise circular motion.

Figure 2J:
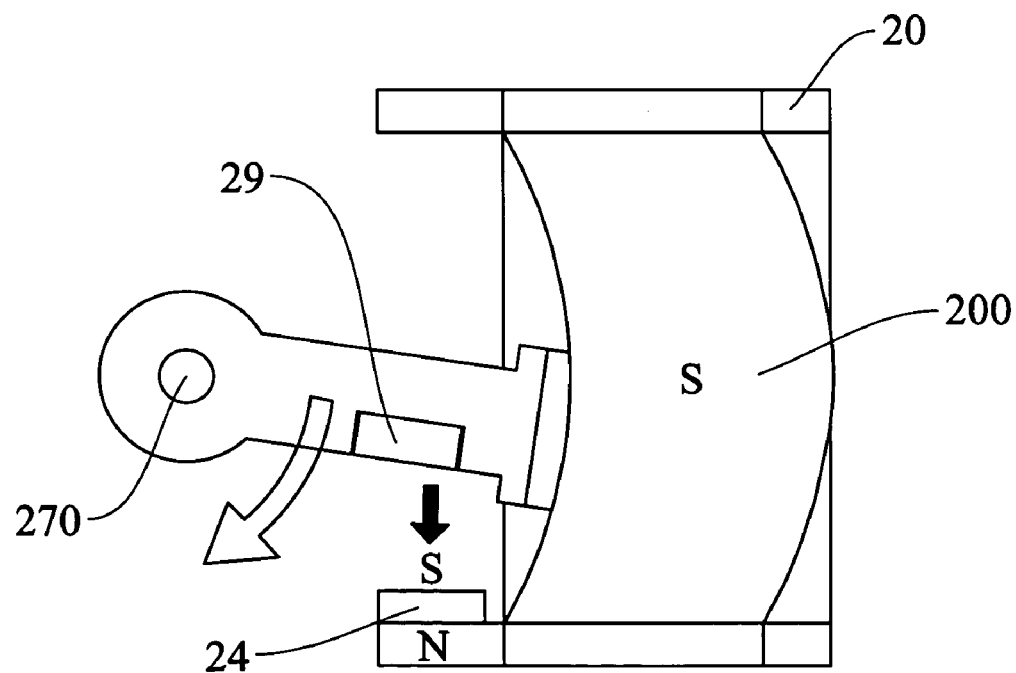
FIG. 2J is a cross section along a line A-A' of FIG. 2C, showing still another detailed structure during motion of the magnetic spring.

A variation of motion of the magnetic spring is shown in FIG. 2J. A metal block 29 is disposed on a side of the shaft 27 and under the yoke 20 on an inner side thereof. An attraction force is generated between the metal block 29 and the fourth magnet 24 such that the shaft 27 moves in a clockwise circular motion.

Accordingly, the combination of magnet and path of the yoke provides a uniform magnetic field, which, being encircled by the coil, causes the upper and lower portions of the coil to be both magnetically induced by the magnetic field, providing more efficient actuating power than prior art with the same coil and size of the structure. Furthermore, embodiments of the invention provide a guiding element. The magnetic induction from the path and the guiding element provides a restoring force for the light shield such that when not in use; the light shield returns to its original position. A cross section of the path along line A-A' is circular. The magnetic field generated by the path provides a predetermined amount of magnetic restoring force irrespective of the location of the guiding element.

Figure 3:
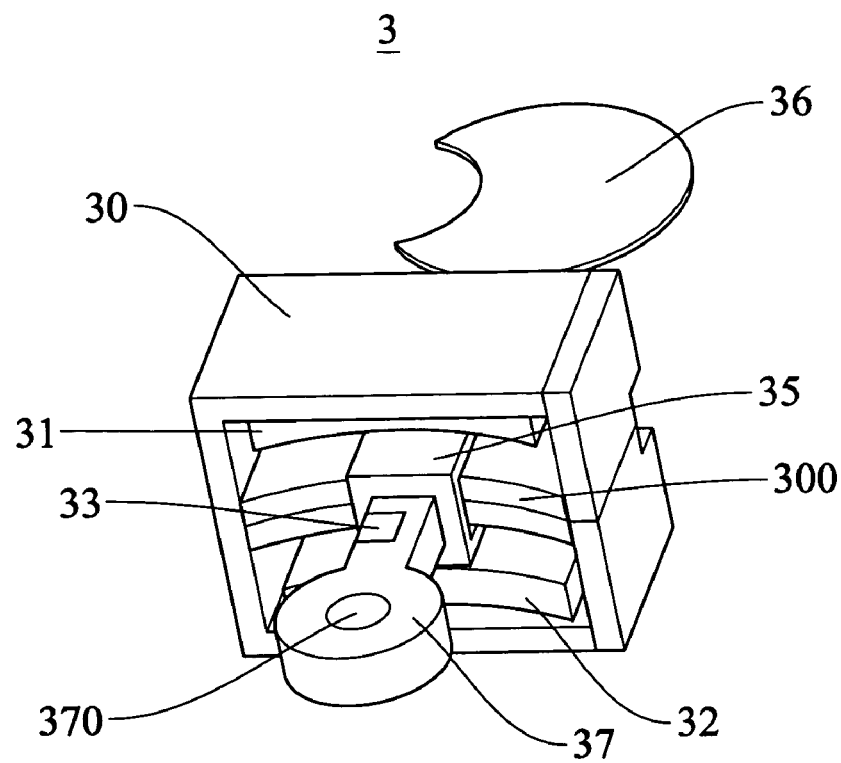
FIG. 3 is a perspective view of another embodiment of a magnetic actuator.

As shown in FIG. 3, another magnetic actuator 3 comprises a yoke 30, a first magnet 31, a second magnet 32, a coil 35, a shaft 37 comprising a hole 370, a light shield 36, and a third magnet 33. Here, the cross section of the first magnet 31 and the second magnet 32 can be circular or polygonal (not shown). If the first and the second magnets 31 and 32 are of the same size and shape, when the coil 35 moves with respect to the hole 370 as a center point in a circular motion, the coil 35 is not worn due to preventing from contact with the path 300 during rotation. Additionally, the coil 35 is restricted in the magnetic field range of the first and the second magnets 31 and 32 during motion, ensuring induction thereof by the same magnetic field. Thus, the current volume of the coil 35 varies linearly with the angle of circular motion of the coil 35, providing a predictable efficiency for the magnetic actuator 3.

Figure 4:
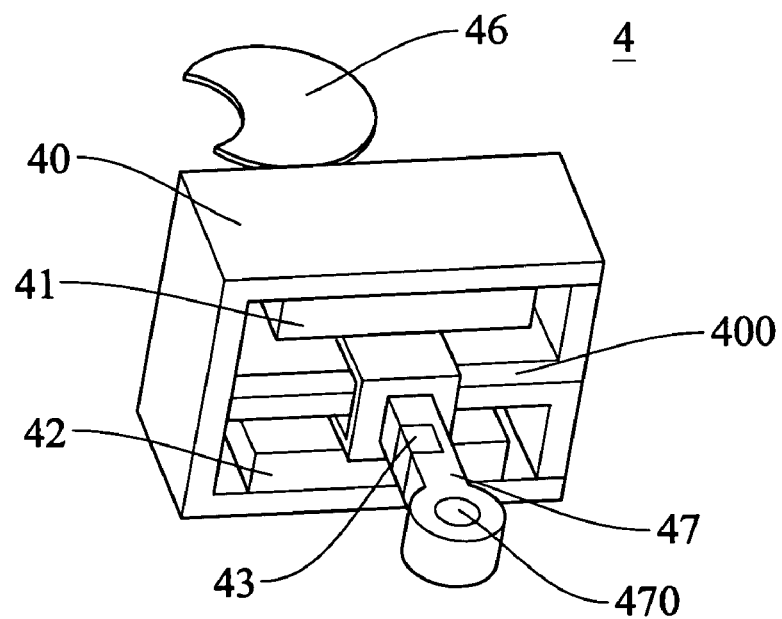
FIG. 4 is a perspective view of yet another embodiment of a magnetic actuator.

FIG. 4 is a perspective view of another magnetic actuator 4, comprising a yoke 40, a first magnet 41, a second magnet 42, a coil 45, a shaft 47 comprising a hole 470, a light shield 46, and a third magnet 43. Here, the cross section of the first magnet 41, the second magnet 42, and the path 400 is rectangular.

Figure 5:
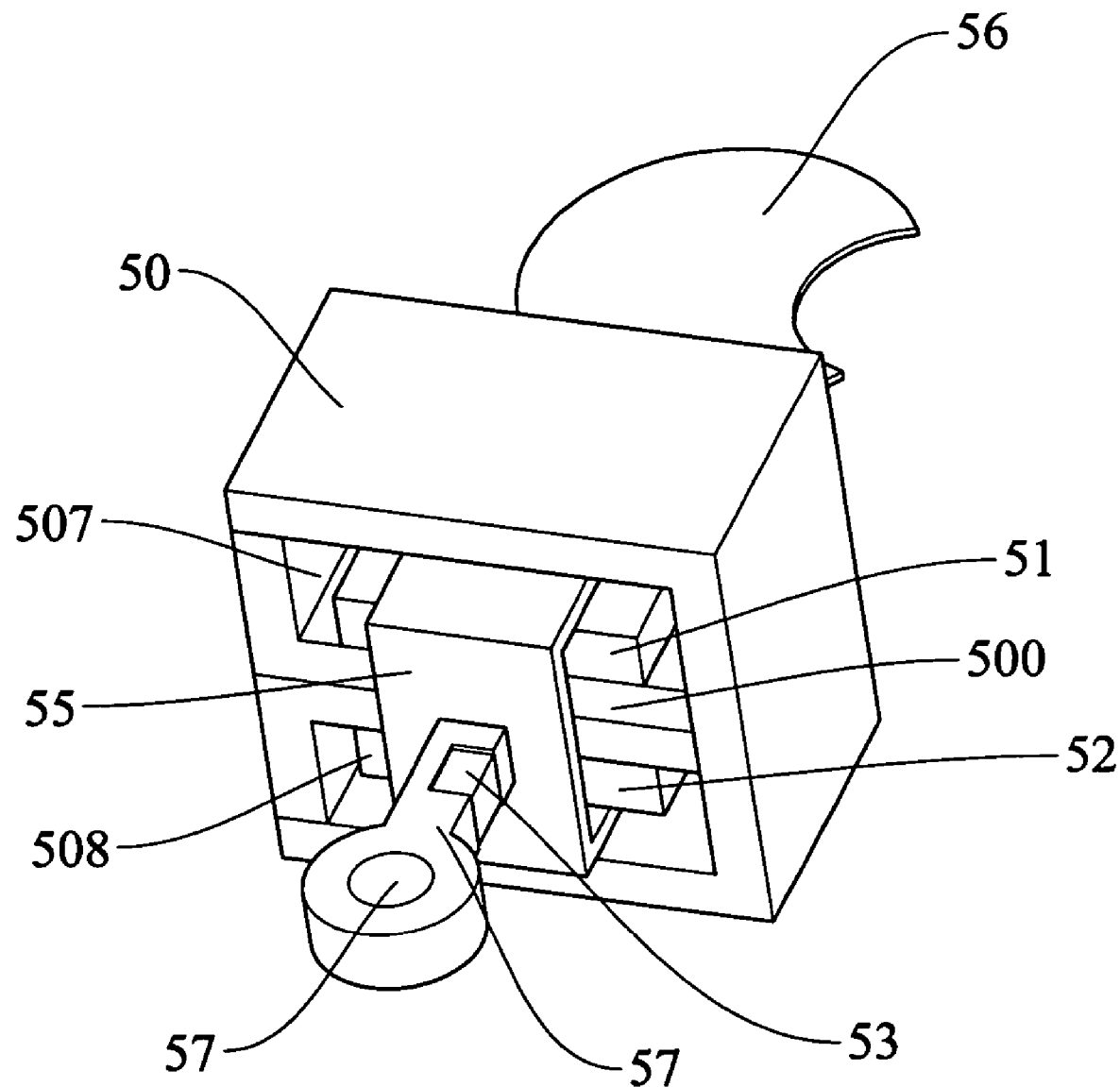
FIG. 5 is a perspective view of still another embodiment of a magnetic actuator.

FIG. 5 is a perspective view of another magnetic actuator 5, comprising a yoke 50, a first magnet 51, a second magnet 52, a coil 55, a shaft 57 comprising a hole 570, a light shield 56, and a third magnet 53. Here, the first magnet 51 is disposed in a first opening 507, and the second magnet 52 is disposed in a second opening 508, with the first magnet 51 and the second magnet 52 contacting two sides of the path 500. The first magnet 51 and the second magnet 52 have the same polarity facing each other. First magnet 51 has a North pole facing down and a South pole facing up. The second magnet 52 has a North pole facing the North pole of the first magnet 51. Thus, a magnetic field from top to bottom is generated in the first opening 507. Another magnetic field from bottom to top is generated in the second opening 508. If the first magnet 51 and the second magnet 52 are of the same size and shape, the magnetic fields have the same magnitude. The coil 55 encircles the path 500, the first magnet 51, and the second magnet 52.

Figure 6A:
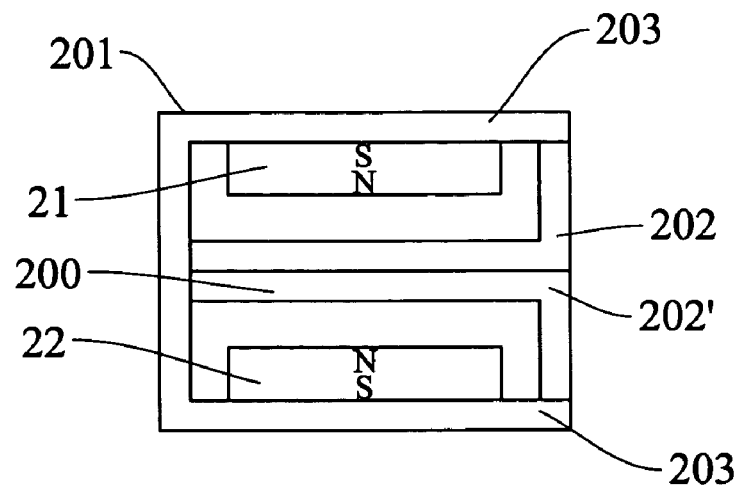
FIG. 6A is a cross section of a yoke, a first magnet, and a second magnet of a magnetic actuator of embodiments of the invention.

Generally, the yokes in the disclosed embodiments form a FIG. 8 from a front view thereof. For convenient manufacturing process, the yoke can be formed by a plurality of yoke plates. For example, in FIG. 2A, the yoke 20 are formed by two L-shaped yoke plates 202, 202' and a U-shaped yoke plate 203, as shown in FIG. 6A. The L-shaped yoke plates 202 and 202' are disposed symmetrically with longer sides contacting to each other. The longer sides of the L-shaped yoke plates 202 and 202' form the path 200. The shorter sides of the L-shaped yoke plates 202 and 202' form a side of the frame 201. Thus, an "8"-shaped yoke 20 is formed. The coil 25 (as shown in FIG. 2A) can be disposed around the path 200. Next, the L-shaped yoke plates 202 and 202' and the U-shaped yoke plate 203 are connected to complete manufacturing of the yoke 20.

Figure 6B:
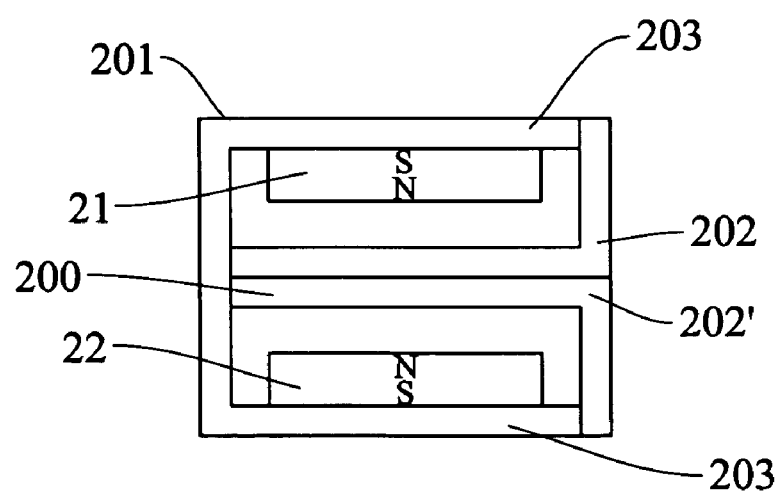
FIG. 6B is a cross section of another combination of a yoke, a first magnet, and a second magnet of a magnetic actuator of embodiments of the invention.

Another manufacturing method of the yoke 20 is shown in FIG. 6B. The shorter sides of the L-shaped yoke plates 202 and 202' extend to an edge of the frame 201 of the yoke 20. The inner edges of the L-shaped yoke plates 202 and 202' and the U-shaped yoke plate 203 are connected to complete manufacturing of the yoke 20.

Figure 6C:
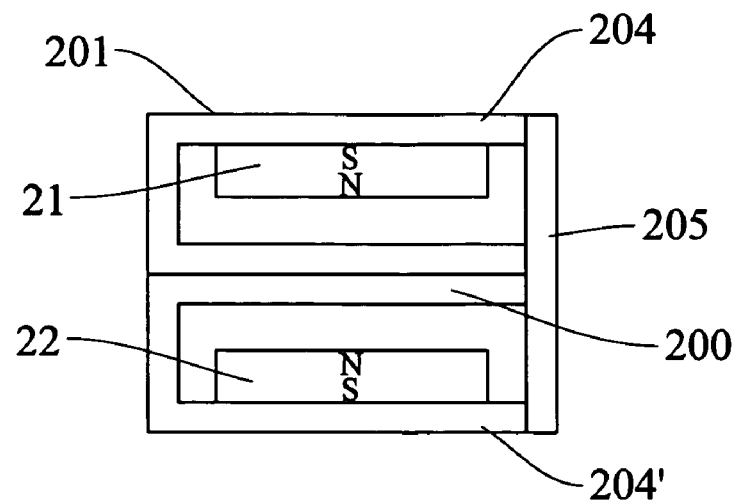
FIG. 6C is a cross section of yet another combination of a yoke, a first magnet, and a second magnet of a magnetic actuator of embodiments of the invention.

FIG. 6C is a cross section of other combination of a yoke. The yoke 20 comprises two U-shaped yoke plates 204 and 204' and a flat yoke plate 205. The sides of the U-shaped yoke plates 204 are symmetrically disposed side by side with opening in the same direction. The contacting sides of the U-shaped yoke plates 204 and 204' form the path 200. The other sides of the U-shaped yoke plates 204 and 204' form the three sides of the frame 201. The flat yoke plate 205 is disposed on the ends of the U-shaped yoke plates 204 and 204', forming the fourth side of the frame 201. Thus, an "8"-shaped yoke 20 is formed. Furthermore, the flat yoke plate 205 can extend to an edge of the frame 201, as shown in FIG. 6C.

Figure 6D:
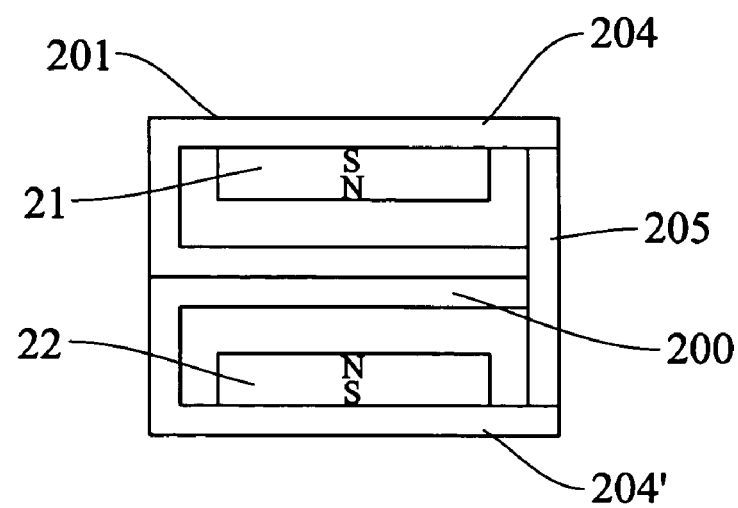
FIG. 6D is a cross section of still another combination of a yoke, a first magnet, and a second magnet of a magnetic actuator of embodiments of the invention.

FIG. 6D is a cross section of another combination of a yoke 20. The flat yoke plate 205 is disposed on the inner edges of the other two sides of the U-shaped yoke plates 204, 204'. The contacting sides of the U-shaped yoke plates 204, 204' are shortened. Thus, an 8-shaped yoke is formed.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A magnetic actuator adopted to be used with an iris diaphragm, comprising:
   a yoke, comprising a first opening and a second opening, a frame encircling the first opening and the second opening, and a path located between the first opening and the second opening;
   a first magnet, disposed in the first opening;
   a second magnet, disposed in the second opening;
   a coil surrounding the path;
   a light shield, connected to a first end of the coil; and
   a guiding element, disposed outside the path and connected to the coil, wherein when a current passes through the coil, the coil reciprocates by a magnetic induction between the first magnet and the second magnet such that the iris diaphragm is adjustable by the light shield; and when there is no current through the coil, a dynamic force produced by the guiding element returns the light shield to an original position wherein the guiding element is a third magnet, producing the dynamic force by magnetic induction of the path to return the light shield to the original position.

2. The magnetic actuator as claimed in claim 1, wherein the first magnet is disposed in the first opening in the vicinity of the frame, and the second magnet is disposed in the second opening in the vicinity of the frame.

3. The magnetic actuator as claimed in claim 1, wherein the first magnet contacts a side of the path, and the second magnet contacts another side of the path.

4. The magnetic actuator as claimed in claim 3, wherein the coil surrounds the path, the first magnet, and the second magnet.

5. The magnetic actuator as claimed in claim 1, wherein the dynamic force comprises an attraction force and a repulsion force generated between the third magnet and the path.

6. A magnetic actuator adopted to be used with an iris diaphragm, comprising a yoke comprising; a first opening and second opening, a frame encircling the first opening and the second opening, and a oath located between the first opening and the second opening; a first magnet, disposed in the first opening, a second magnet, disposed in the second opening, a coil surrounding the path; a light shield, connected to a first end of the coil and a guiding element, disposed outside the oath and connected to the coil, wherein when a current passes through the coil, the coil reciprocates by magnetic induction between the first magnet and the second magnet such that the iris diaphragm is adjustable by the light shield, and when there is no current through the coil, a dynamic force produced by the guiding element returns the light shield to an original position, wherein the guiding element is a third magnet and the magnetic actuator further comprises a fourth magnet, the third magnet producing dynamic force by magnetic induction of the fourth magnet to return the light shield to the original position.

7. The magnetic actuator as claimed in claim 6, wherein the fourth magnet is disposed on the yoke.

8. The magnetic actuator as claimed in claim 6, wherein the dynamic force is an attraction force or a repulsion force generated between the third magnet and the fourth magnet.

9. A magnetic actuator adopted to be used with an iris diaphragm, comprising a yoke comprising; a first opening and a second opening, a frame encircling the first opening and the second opening, and a oath located between the first opening and the second opening; a first magnet, disposed in the first opening, a second magnet, disposed in the second opening, a coil surrounding the path; a light shield, connected to a first end of the coil and a guiding element, disposed outside the path and connected to the coil, wherein when a current passes through the coil, the coil reciprocates by a magnetic induction between the first magnet and the second magnet such that the iris diaphragm is adjustable by the light shield, and when there is no current through the coil, a dynamic force produced by the guiding element returns the light shield to an original position, and a magnet, and wherein the guiding element is a metal block, producing the dynamic force by a magnetic induction of the magnet to return the light shield to the original position.

10. The magnetic actuator as claimed in claim 9, wherein the magnet is disposed on the yoke.

11. The magnetic actuator as claimed in claim 9, wherein the dynamic force is an attraction force generated between the magnet and the metal block.

12. The magnetic actuator as claimed in claim 1, wherein a cross section of the path in the moving direction of the coil is circular, rectangular, or polygonal.

13. The magnetic actuator as claimed in claim 1, wherein the first magnet or the second magnet disposed in the first opening closely contacts an inner wall of the frame, a cross section of the first magnet or the second magnet in the moving direction of the coil is circular, rectangular, or polygonal.

14. The magnetic actuator as claimed in claim 1, wherein the first magnet and the second magnet are of the same size and shape and arranged with the same polarity facing each other.

15. The magnetic actuator as claimed in claim 1, wherein the guiding element is disposed on the light shield.

16. The magnetic actuator as claimed in claim 1, further comprising a shaft, extending from a second end opposite to the first end of the coil, and the shaft comprises a hole; and when current passes through the coil, the coil is magnetically induced by the first magnet and the second magnet such that the coil moves in a circular motion with respect to the hole as a center point for the light shield to adjust the iris diaphragm.

17. The magnetic actuator as claimed in claim 16, wherein the shaft is perpendicular to the path.

18. The magnetic actuator as claimed in claim 16, wherein the guiding element is disposed on the shaft.

19. The magnetic actuator as claimed in claim 1, wherein the yoke comprises two L-shaped yoke plates and a U-shaped yoke plate; the L-shaped yoke plates are disposed symmetrically, constituting the path and one side of the frame, and the U-shaped yoke plate constitutes the other three sides of the frame.

20. The magnetic actuator as claimed in claim 1, wherein the yoke comprises two U-shaped yoke plates and a flat yoke plate; each U-shaped yoke plate comprises a side, and the sides thereof are symmetrically arranged, contacting each other and pointing in the same direction to form the path and the three sides of the frame; the flat yoke plate forms the fourth side of the frame.

21. The magnetic actuator as claimed in claim 1, wherein the magnetic actuator is applicable to an optical device, comprises an optical projector, a rear projector, or a camera.

* * * * *